US012657077B2

(12) United States Patent
Paulraj

(10) Patent No.: US 12,657,077 B2
(45) Date of Patent: Jun. 16, 2026

(54) SYSTEM AND METHOD FOR INTENT DRIVEN MANAGEMENT SERVICE ORCHESTRATION AND DEPLOYMENT FOR A REMOTE ACCESS CONTROLLER

(71) Applicant: Dell Products L.P., Round Rock, TX (US)

(72) Inventor: Deepaganesh Paulraj, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 467 days.

(21) Appl. No.: 18/477,054

(22) Filed: Sep. 28, 2023

(65) Prior Publication Data
US 2025/0045133 A1     Feb. 6, 2025

(51) Int. Cl.
*G06F 9/54*          (2006.01)
(52) U.S. Cl.
CPC ................................... *G06F 9/547* (2013.01)

(58) Field of Classification Search
None
See application file for complete search history.

(56) References Cited

U.S. PATENT DOCUMENTS

2003/0110403 A1 * 6/2003 Crutchfield ............. G06F 1/263
                                                      713/300
2005/0235282 A1 * 10/2005 Anderson ................. G06F 8/65
                                                      717/178

* cited by examiner

*Primary Examiner* — Craig C Dorais
(74) *Attorney, Agent, or Firm* — McDermott Will & Schulte LLP

(57) ABSTRACT
In one or more embodiments, one or more systems may comprise a Remote Access Controller (RAC) configured with a minimum number of built-in features and a private cloud server (PCS) communicatively coupled to the RAC and communicatively coupled to an external cloud server. Based on the available service and one or more of customer preference and performance, embodiments may determine whether to communicate with a public cloud server to process the information or whether to install the available service in the PCS or in the server.

20 Claims, 8 Drawing Sheets

SYSTEM AND METHOD FOR INTENT DRIVEN MANAGEMENT SERVICE ORCHESTRATION AND DEPLOYMENT FOR A REMOTE ACCESS CONTROLLER

BACKGROUND

Field of the Disclosure

This disclosure relates generally to information handling systems and more particularly to remote access controllers (RACs) in servers in data centers, and more particularly to systems and methods for monitoring and managing RACs.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Embodiments may be directed to a system in a server comprising a plurality of devices, a data processing unit (DPU) executing a DPU operating system (OS) and a memory storing one or more of a server OS and a unified extensible firmware interface (UEFI). The system comprises a remote access controller (RAC) and a private cloud server (PCS) communicatively coupled to the server and an external cloud server.

The RAC comprises a RAC processor and a memory storing: a set of controls, the first set of controls comprising a power control for monitoring power supplied to the server and a thermal control for monitoring a temperature of the server; a hardware abstraction layer (HAL) for communicating with the plurality of devices; a Desktop Bus (D-Bus) communications bus interface for communicating with the HAL and facilitate communications between a set of applications executing on the server; a D-Bus to Remote Procedure Call (RPC) mapper for translating communications from one or more devices of the plurality of devices into an RPC format; a D-Bus to Representational State Transfer (REST) mapper for translating communications from one or more devices of the plurality of devices into a REST Application Programming Interface (API) format; a Remote Procedure Call (RPC) queue to facilitate communication between two or more applications of the set of applications executing on the server; and a set of instructions executable by the RAC processor to execute the controls stored in the memory in the RAC.

The private cloud server comprises a PCS processor and a memory storing a set of instructions executable by the PCS processor for: communicating with the external cloud server to identify a set of available services from a plurality of available services; determining a location for executing one or more available services of the set of available services for processing information on the server; and installing the one or more available services of the set of available services at the location.

In some embodiments, the set of PCS instructions are executable by the PCS processor for: determining an available service of the set of available services is needed by the server to process a set of information; installing the available service in a set of services in the server; determining when the available service has processed the information; and uninstalling the available service from the set of services in the memory in the server. In some embodiments, the set of PCS instructions are executable by the PCS processor for: determining the available service of the set of available services is needed by the RAC to process a set of information; installing the available service in a set of services in the memory in the RAC; determining when the available service has processed the information; and uninstalling the available service from the set of services in the memory in the RAC. In some embodiments, the set of PCS instructions are executable by the PCS processor for: determining the available service of the set of available services is needed by a server operating system (OS) or Unified Extensible Framework Interface (UEFI) to process a set of information; installing the available service in a set of services accessible by the server OS or the UEFI; determining when the available service has processed the information; and uninstalling the available service from the set of services accessible by the server OS or the UEFI. In some embodiments, the set of PCS instructions are executable by the PCS processor for: determining an available service of the set of available services is needed by a data processing unit (DPU) operating system (OS) to process a set of information; installing the available service in a set of services in a memory accessible by the DPU OS; determining when the available service has processed the information; and uninstalling the available service from the set of services in the memory accessible by the DPU OS. In some embodiments, the set of PCS instructions are executable by the PCS processor for: determining the PCS as a location for executing one or more available services of the set of available services for processing information; and installing the one or more available services of the set of available services in the PCS. In some embodiments, the set of PCS instructions are executable by the PCS processor for: determining a public cloud server as a location for executing one or more available services of the set of available services for processing information; and communicating with the public cloud server executing the one or more available services.

Embodiments may be directed to a data center comprising a plurality of servers. Each server comprises a remote access controller (RAC) having a RAC processor and a memory storing: a set of controls, the first set of controls comprising a power control for monitoring power supplied to the server and a thermal control for monitoring a temperature of the server; a hardware abstraction layer (HAL) for communicating with the plurality of devices; a Desktop Bus (D-Bus) communications bus interface for communicating with the HAL and facilitate communications between a set of applications executing on the server; a D-Bus to Remote Procedure Call (RPC) mapper for translating communications from one or more devices of the plurality of devices into an RPC format; a D-Bus to Representational State Transfer (REST) mapper for translating communications from one or more devices of the plurality of devices into a REST Application Programming Interface (API) format; a Remote Procedure Call (RPC) queue to facilitate communication between two or more applications of the set of applications executing on the server; and a set of instructions executable by the RAC processor to execute the controls stored in the memory in the RAC. At least one server of the plurality of servers comprises a private cloud server (PCS) communicatively coupled to the plurality of servers and an external cloud server, the private cloud server comprising: a PCS processor; and a memory storing a set of instructions executable by the PCS processor for: communicating with the external cloud server to identify a set of available services from a plurality of available services; determining a location for executing one or more available services of the set of available services for processing information on the server; and installing the one or more available services of the set of available services at the location.

In some embodiments, the set of PCS instructions are executable by the PCS processor for: determining an available service of the set of available services is needed by a server of the plurality of servers to process a set of information; installing the available service in a set of services in the server; determining when the available service has processed the information; and uninstalling the available service from the set of services in the memory in the server. In some embodiments, the set of PCS instructions are executable by the PCS processor for: determining the available service of the set of available services is needed by a RAC in the server to process a set of information; installing the available service in a set of services in the memory in the RAC; determining when the available service has processed the information; and uninstalling the available service from the set of services in the memory in the RAC. In some embodiments, the set of PCS instructions are executable by the PCS processor for: determining the available service of the set of available services is needed by a server operating system (OS) or a Unified Extensible Framework Interface (UEFI) to process a set of information on the server; installing the available service in a set of services in a memory accessible by the server OS or the UEFI; determining when the available service has processed the information; and uninstalling the available service from the set of services in the memory accessible by the server OS or the UEFI. In some embodiments, the set of PCS instructions are executable by the PCS processor for: determining an available service of the set of available services is needed by a data processing unit (DPU) operating system (OS) to process a set of information in the server; installing the available service in a set of services in a memory accessible by the DPU OS; determining when the available service has processed the information; and uninstalling the available service from the set of services in the memory accessible by the DPU OS. In some embodiments, the set of PCS instructions are executable by the PCS processor for: determining the PCS as a location for executing one or more available services of the set of available services for processing information; and installing the one or more available services of the set of available services in the PCS. In some embodiments, the set of PCS instructions are executable by the PCS processor for: determining a public cloud server as a location for executing one or more available services of the set of available services for processing information; and communicating with the public cloud server executing the one or more available services.

Embodiments may be directed to a method of operating a data center comprising a plurality of servers, the method comprising: storing, on each server of the plurality of servers: a set of controls, the first set of controls comprising a power control for monitoring power supplied to the server and a thermal control for monitoring a temperature of the server; a hardware abstraction layer (HAL) for communicating with a plurality of devices; a Desktop Bus (D-Bus) communications bus interface for communicating with the HAL and facilitate communications between a set of applications executing on the server; a D-Bus to Remote Procedure Call (RPC) mapper for translating communications from one or more devices of the plurality of devices into an RPC format; a D-Bus to Representational State Transfer (REST) mapper for translating communications from one or more devices of the plurality of devices into a REST Application Programming Interface (API) format; a Remote Procedure Call (RPC) queue to facilitate communication between two or more applications of the set of applications executing on the server; and a set of instructions executable by the RAC processor to execute the controls stored in the memory in the RAC. The method further comprises identifying, by a private cloud server, a set of available services from a plurality of available services; determining a location for executing one or more available services of the set of available services, the location comprising one of a memory in the server, a memory in the RAC or a memory in the private cloud server; and retrieving the one or more available services of the set of available services from an external cloud server over a network; installing the one or more available services at the location; and executing the set of available services for processing information on a set of servers of the plurality of servers.

In some embodiments, the set of PCS instructions are executable by the PCS processor for: determining an available service of the set of available services is needed by a server of the plurality of servers to process a set of information; installing the available service in a set of services in the server; determining when the available service has processed the information; and uninstalling the available service from the set of services in the memory in the server. In some embodiments, the set of PCS instructions are executable by the PCS processor for: determining the available service of the set of available services is needed by a RAC in the server to process a set of information; installing the available service in a set of services in the memory in the RAC; determining when the available service has processed the information; and uninstalling the available service from the set of services in the memory in the RAC. In some embodiments, the set of PCS instructions are executable by the PCS processor for: determining the available service of the set of available services is needed by a server operating system (OS) or a Unified Extensible Framework Interface (UEFI) to process a set of information on the server; installing the available service in a set of services in a memory accessible by the server OS or the UEFI; determining when the available service has processed the information; and uninstalling the available service from the set of services in the memory accessible by the server OS or the UEFI. In some embodiments, the set of PCS instructions are executable by the PCS processor for: determining an available service of the set of available services is needed by a data processing unit (DPU) operating system (OS) to process a set of information in the server; installing the available service in a set of services in a memory accessible by the DPU OS; determining when the available service has processed the information; and uninstalling the available service from the set of services in the memory accessible by the DPU OS. In some embodiments, the set of PCS instructions are executable by the PCS processor for: determining the PCS as a location for executing one or more available services of the set of available services for processing information; and installing the one or more available services of the set of available services in the PCS. In some embodiments, the set of PCS instructions are executable by the PCS processor for: determining a public cloud server as a location for executing one or more available services of the set of available services for processing information; and communicating with the public cloud server executing the one or more available services.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1:
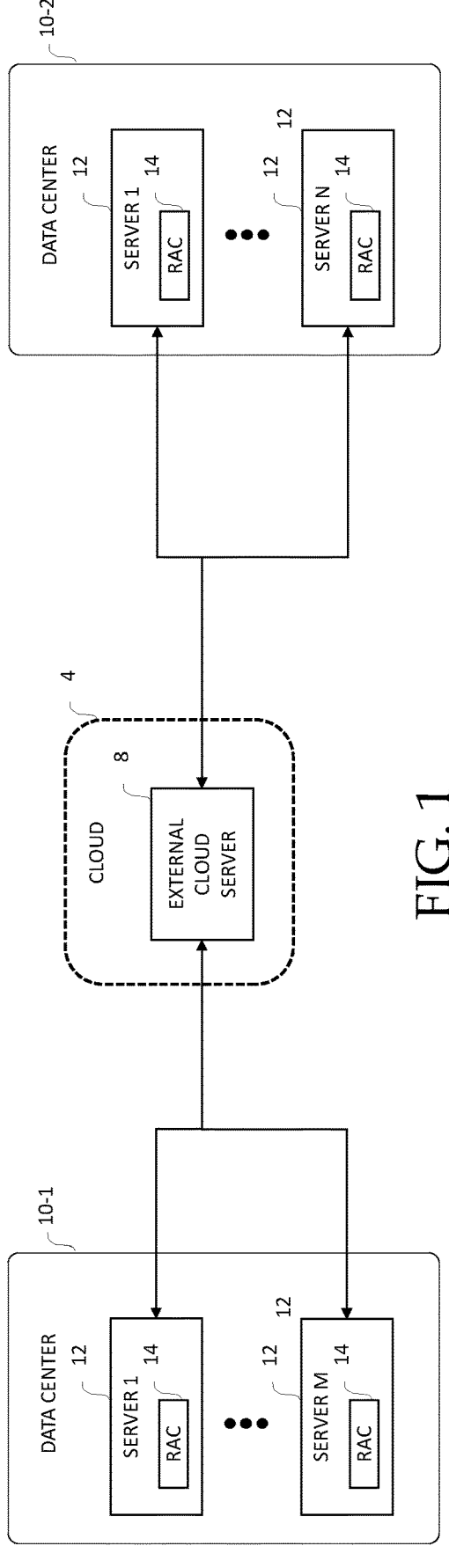
FIG. 1 depicts an example architecture of a plurality of data centers, with each data center containing a plurality of servers, with each server communicatively coupled to an external cloud server for managing the server.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

An information handling system (IHS) may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, an IHS may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS may include or have a form factor of that of or similar to one or more of a laptop, a notebook, a telephone, a tablet, and a PDA, among others. For example, a portable IHS may be readily carried and/or transported by a user (e.g., a person). In one or more embodiments, components of an IHS may include one or more storage devices, one or more communications ports for communicating with external devices as well as various input and output (I/O) devices, such as a keyboard, a mouse, and a video display, among others. In one or more embodiments, IHS may include one or more buses operable to transmit communication between or among two or more hardware components. In one example, a bus of an IHS may include one or more of a memory bus, a peripheral bus, and a local bus, among others. In another example, a bus of an IHS may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit (I2C) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, an IHS may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

An IHS may include a processor, a volatile memory medium, non-volatile memory media, an I/O subsystem, and a network interface. Volatile memory medium, non-volatile memory media, I/O subsystem, and network interface may be communicatively coupled to processor. In one or more embodiments, one or more of volatile memory medium, non-volatile memory media, I/O subsystem, and network interface may be communicatively coupled to processor via one or more buses, one or more switches, and/or one or more root complexes, among others. In one example, one or more of a volatile memory medium, non-volatile memory media, an I/O subsystem, a and network interface may be communicatively coupled to the processor via one or more PCI-Express (PCIe) root complexes. In another example, one or more of an I/O subsystem and a network interface may be communicatively coupled to processor via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

A volatile memory medium may include volatile storage such as, for example, RAM, DRAM (dynamic RAM), EDO RAM (extended data out RAM), SRAM (static RAM), etc. One or more of non-volatile memory media may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more non-volatile storages.

In one or more embodiments, a network interface may be utilized in communicating with one or more networks and/or one or more other information handling systems. In one example, network interface may enable an IHS to communicate via a network utilizing a suitable transmission protocol and/or standard. In a second example, a network interface may be coupled to a wired network. In a third example, a network interface may be coupled to an optical network. In another example, a network interface may be coupled to a wireless network. In one instance, the wireless network may include a cellular telephone network. In a second instance, the wireless network may include a satellite telephone network. In another instance, the wireless network may include a wireless Ethernet network (e.g., a Wi-Fi network, an IEEE 802.11 network, etc.).

In one or more embodiments, a network interface may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, a processor may execute processor instructions in implementing at least a portion of one or more systems, at least a portion of one or more flowcharts, at least a portion of one or more methods, and/or at least a portion of one or more processes. In one example, a processor may execute processor instructions from one or more memory media in implementing at least a portion of one or more systems, at least a portion of one or more flowcharts, at least a portion of one or more methods, and/or at least a portion of one or more processes. In another example, a processor may execute processor instructions via a network interface in implementing at least a portion of one or more systems, at least a portion of one or more flowcharts, at least a portion of one or more methods, and/or at least a portion of one or more processes.

In one or more embodiments, a processor may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, a processor may interpret and/or execute program instructions and/or process data stored locally (e.g., via memory media and/or another component of an IHS). In another example, a processor may interpret and/or execute program instructions and/or process data stored remotely (e.g., via a network storage resource).

In one or more embodiments, an I/O subsystem may represent a variety of communication interfaces, graphics interfaces, video interfaces, user input interfaces, and/or peripheral interfaces, among others. For example, an I/O subsystem may include one or more of a touch panel and a display adapter, among others. For instance, a touch panel may include circuitry that enables touch functionality in conjunction with a display that is driven by a display adapter.

A non-volatile memory medium may include an operating system (OS) and applications (APPs). In one or more embodiments, one or more of an OS and APPs may include processor instructions executable by a processor. In one example, a processor may execute processor instructions of one or more of OS and APPs via a non-volatile memory medium. In another example, one or more portions of the processor instructions of one or more of an OS and APPS may be transferred to a volatile memory medium and a processor may execute the one or more portions of the processor instructions.

Non-volatile memory medium may include information handling system firmware (IHSFW). In one or more embodiments, IHSFW may include processor instructions executable by a processor. For example, IHSFW may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, a processor may execute processor instructions of IHSFW via non-volatile memory medium. In another instance, one or more portions of the processor instructions of IHSFW may be transferred to volatile memory medium, and processor may execute the one or more portions of the processor instructions of IHSFW via volatile memory medium.

Data centers may have large numbers of information handling systems such as servers for processing information. A data center facility may have one or more floors with each floor having racks of servers. A server may be processing a set of information independently or a group of servers may be working on the same set of information.

Turning now to FIG. 1, an architectural diagram of a plurality of data centers 10 illustrates that each data center 10 may contain a plurality of information handling systems 12 (also referred to as servers 12). Data center 10-1 may contain M servers 12 and data center 10-2 may contain N servers, where each of M and N may be any number between two to over a thousand. Each server 12 may comprise Remote Access Controller (RAC) 14 to allow remote monitoring and management of any server 12 in data center 10. RAC 14 may comprise a Dell Remote Access Controller (DRAC) or an integrated Dell Remote Access Controller (iDRAC) for remote monitoring and management.

Figure 2:
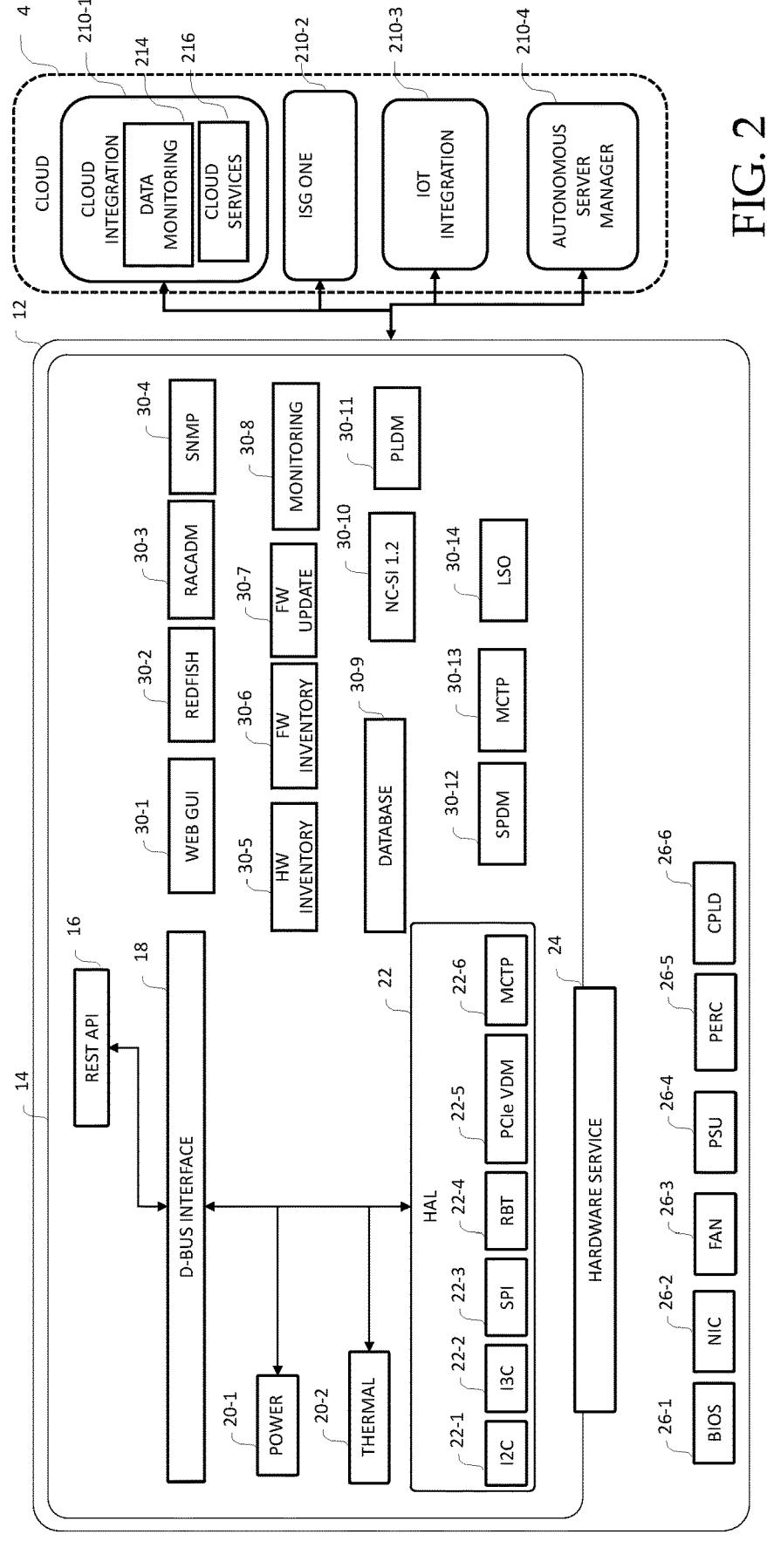
FIG. 2 depicts an example of a server with a Remote Access Controller (RAC), illustrating a set of services commonly installed in firmware on a RAC for remotely monitoring and managing the server.

Turning to FIG. 2, each server 12 has remote access controller (RAC) 14 with firmware to allow for remote monitoring and managing of server 12, and server 12 may need to communicate with one or more other servers 12 in data center 10. Firmware within RAC 14 may include a Representational State Transfer Application Programming Interface (REST API) 16 that allows servers 12 to communicate with each other. Remote monitoring may require communications with processes running in RAC 14. A desktop bus (D-Bus) interface 18 or other inter-process communications mechanism stored in memory in RAC 14 may enable local communication between processes stored in firmware on RAC 14.

Firmware in RAC 14 may include a set of built in features 30 executable by a processor in RAC 14. For example, each server 12 has a power supply unit (PSU) for receiving power from a power source and transforming the power into usable power by the server 12. Firmware in RAC 14 includes power control 20-1 for monitoring of power received by the PSU to determine when server 12 has switched power modes and allow for remote switching of server 12 between power modes. Similarly, server 12 has a fan for cooling server 12 and firmware in RAC 14 includes thermal control 20-2 for monitoring of temperatures in server 12 to determine if the fan is operating, determining when to operate the fan and enabling remote operation of the fan.

Firmware in RAC 14 may also store hardware abstraction layer (HAL) 22 for communication with and monitoring of peripheral devices. Within HAL 22, features such as Inter-Integrated Circuit (I2C) protocol 22-1, Improved Inter-Integrated Circuit (I3C) protocol 22-2, Serial Peripheral Interface (SPI) 22-3, Reduced Media-Independent Interface (RMII) 22-4, Peripheral Connect Interface Express Vendor Defined Message (PCIe VDM) 22-5 and management component transport protocol (MCTP) 22-6 allow communications with chips, processors and microcontrollers in server 12.

Server 12 includes hardware 24 such as processors for processing information, memory for storing information, a fan for cooling server 12 including devices and components in server 12, a network integrated circuit (NIC) for communications, other controllers such as RAID controllers, and Complex Logic Programmable Devices (CPLDs). Accordingly, Firmware in RAC 14 may include other features such as Basic Input Output Service (BIOS) 26-1, NIC 26-2, fan control 26-3, PSU control 26-4 for operating a PSU, RAID feature 26-5 for managing a RAID and CPLD feature 26-6 for monitoring and managing a CPLD.

Firmware in RAC 14 may typically include other features 30 for monitoring and managing servers 12 in data centers 10. The examples depicted in FIG. 3 and provided below represent more common features found in RAC 14, and RAC 14 may store additional features 30 not listed.

Web Graphical User Interface (GUI) 30-1 is a web-based application that processes network events for displaying the data in a graphical format for users to view on an attached display. Redfish® 30-2 is an application programming interface (API) that uses RESTful semantics to access data defined in model format for systems management. Remote Access Controller admin (RACADM) feature 30-3 is a scriptable interface to allow remote configuration of RAC 14. Simple Network Management Protocol (SNMP) feature 30-4 may be used to collect data related to network changes and determine the status of network-connected devices. Hardware inventory feature 30-5 may maintain an inventory and properties of all hardware installed on server 12. Software inventory feature 30-6 may maintain an inventory and versions of all software running on server 12. Firmware update feature 30-7 may maintain a list of firmware including versions and facilitate updates of any firmware on server 12. Monitoring feature 30-8 may monitor operation of components or devices in server 12 and record values or may define what operations are to be monitored and how the monitoring should occur. RAC 14 may include database 32 for storing information about components or devices in server 12. Network Controller-Sideband Interface (e.g., NC-SI 1.2) feature 30-10 defines a control communication protocol between a baseboard management controller (BMC) and one or more Network Interface Controllers (NICs). Platform Level Data Model (PLDM) feature 30-11 defines the contents of a firmware update package. Security Protocol and Data Models (SPDM) feature 30-12 enables authentication, attestation and key exchange for enabling security of server 12. Management Control Transport Protocol (MCTP) feature 30-13 stores message formats, transport descriptions, message exchange patterns and endpoint characteristics related to communications between components.

Servers 12 described above have several shortcomings. All features 30 are stored in memory in each RAC 14 of each server 12, regardless of whether a feature 30 will be used for a particular server 12. Furthermore, features 30 are getting more robust and require more memory to manage devices in servers 12. For example, RAC 14 in some generations of servers 12 may have 512 Megabytes (MB) of memory to store all features 30, RAC 14 in later generations of servers 12 may have 1 Gigabyte (GB) of memory to store all features 30, and RAC 14 in later generations of servers 12 may have 2 GB of memory to store all features 30. Although each server 12 is provided with the full suite of features 30, many customers or servers 12 require a limited set of features 30. For security reasons, some users prefer to have only firmware code which they know they will use. Subscription-based licensing, in which a user pays for only the features 30 needed, may be preferred. However, only about 35% of datacenter servers 12 contain the latest firmware for RAC 14 and features 30 are often unnecessarily tied to specific hardware capabilities. Customization of features 30 via Software Developer Kits (SDK) may be limited or unavailable due to hardware capabilities or software requirements. Some devices (e.g., Baseboard Management Controllers (BMCs)) are expected to be commoditized, resulting in greater complexity and/or more features 30 that would need to be installed on each RAC 14.

Figure 3:
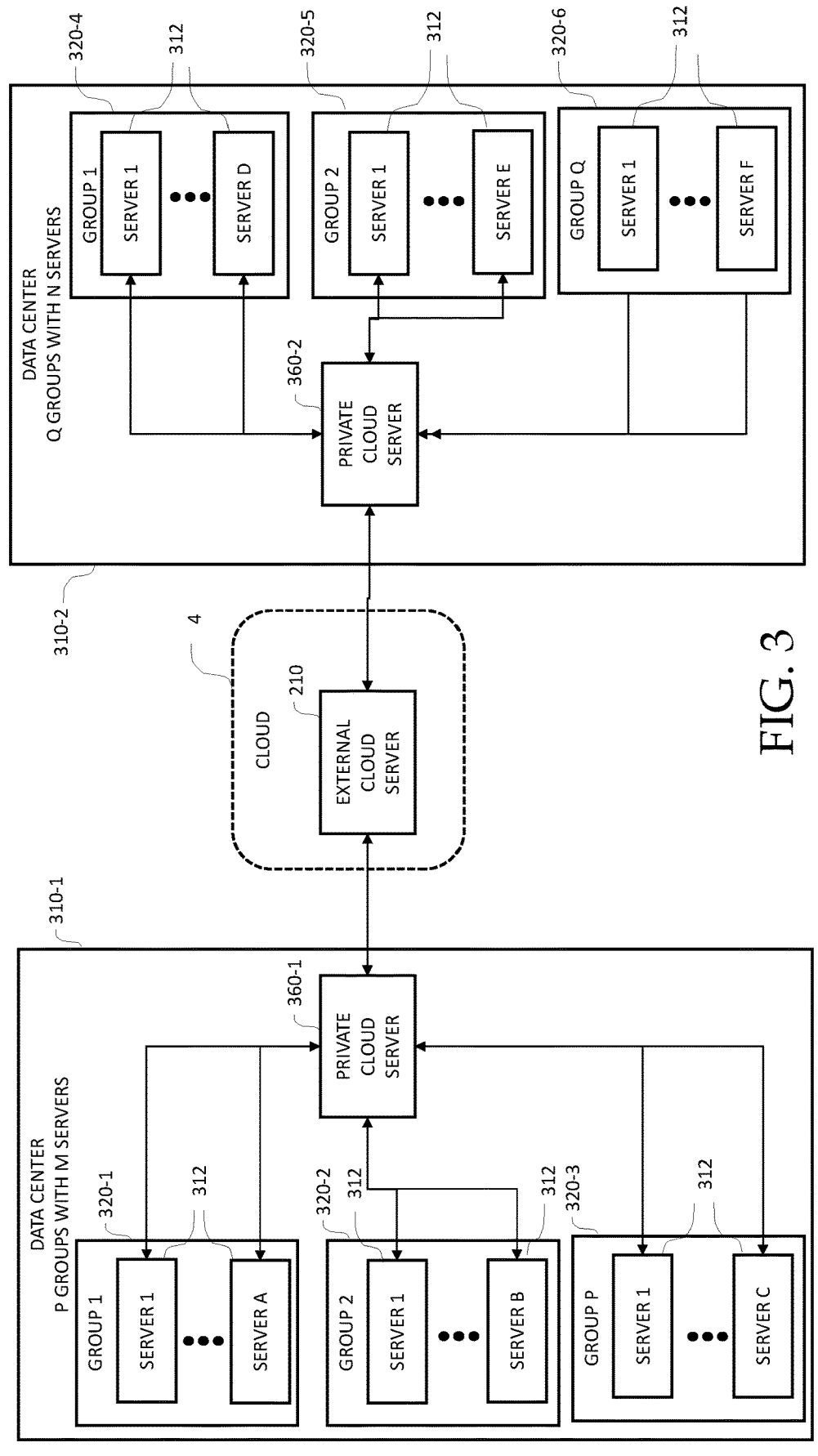
FIG. 3 depicts a system architecture of a plurality of data centers communicatively coupled to an external cloud server, with each data center containing a plurality of servers and a private cloud server, with each server being communicatively coupled to the private cloud server for managing the servers, in accordance with some embodiments.
Figure 4:
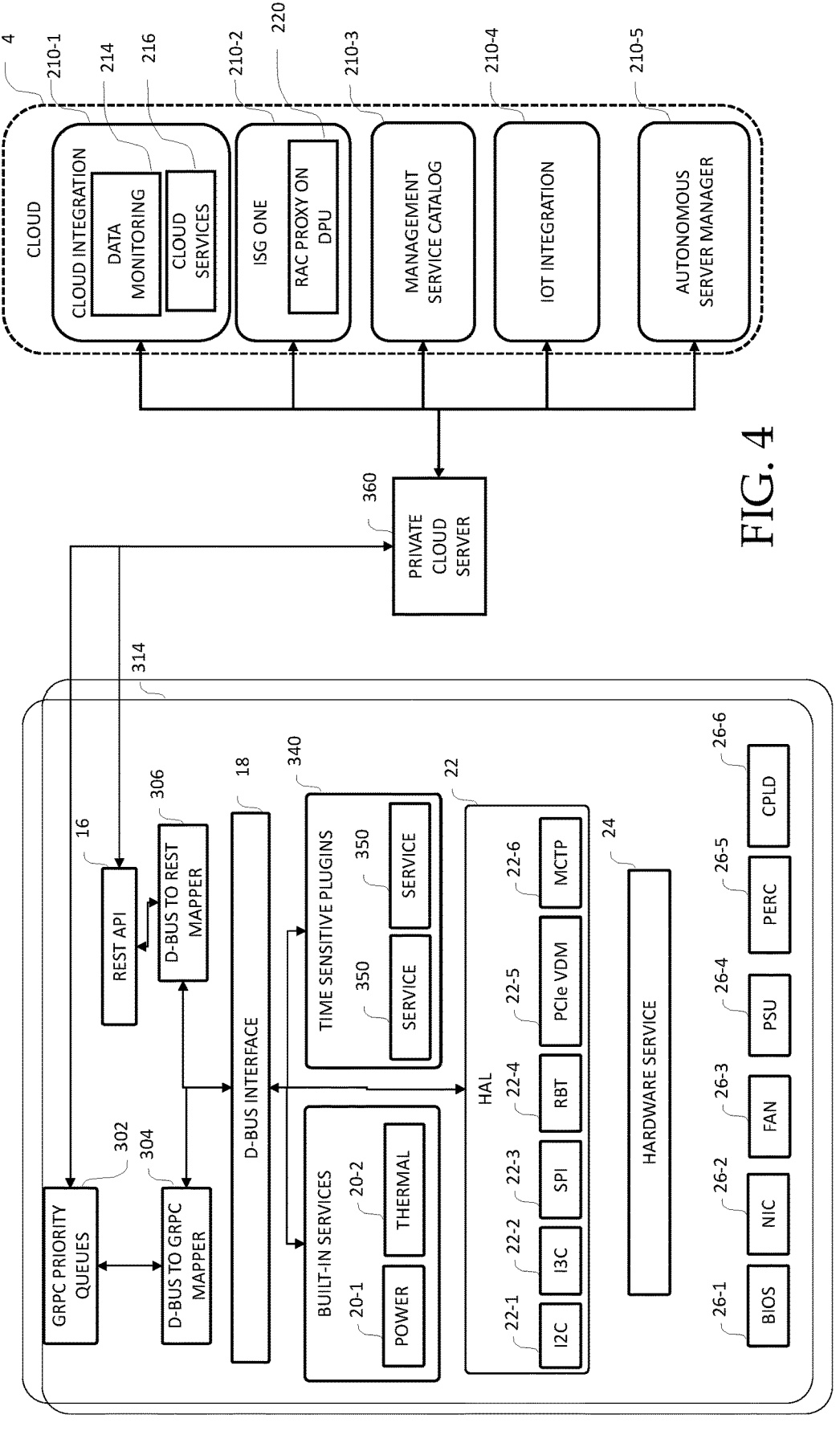
FIG. 4 depicts a portion of the system architecture of FIG. 3, illustrating an embodiment of a RAC that may be installed in a server and communicatively coupled to a private cloud server and one or more external cloud servers for supporting the server.
Figure 5:
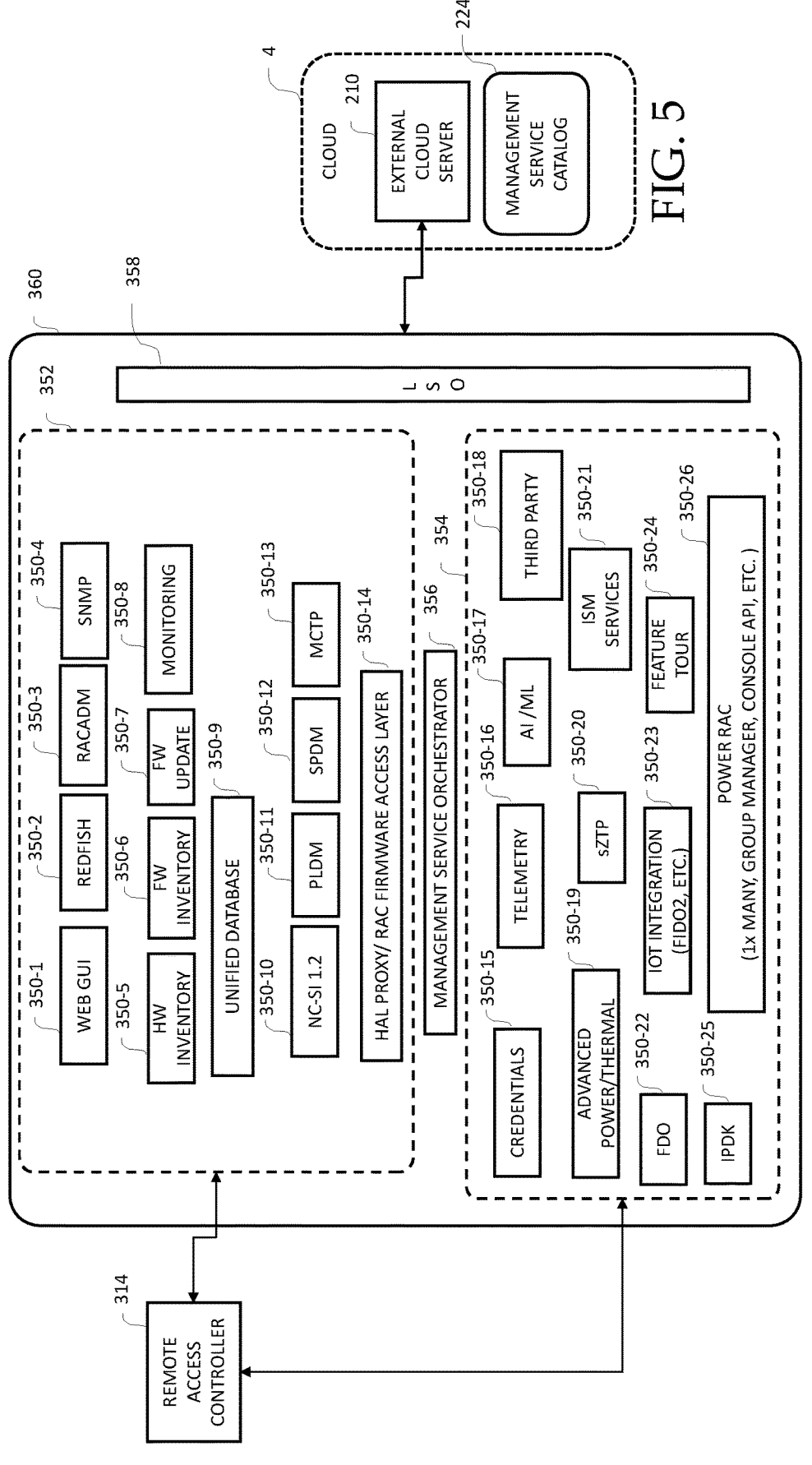
FIG. 5 depicts a portion of the system architecture of FIG. 3, illustrating one embodiment of a private cloud server with firmware installed and communicatively coupled to a RAC in a server and one or more external cloud servers.

Turning to FIGS. 3, 4 and 5, embodiments disclosed herein allow a remote access controller (RAC) 314 in server 312 to have firmware that has a minimum number of features 30 that can be augmented as needed with any number of available services 350 executing on a private cloud server 360. In some embodiments, RAC 314 may be manufactured with firmware including a minimum Hardware Abstraction Layer (HAL). Some controls 20 and features 30 may remain as built-in controls 20 or features 30 in firmware in RAC 314. For example, any time server 12 is operating, PSU control 20-1 monitors power supplied to the PSU and is therefore maintained in firmware in RAC 314. Embodiments may augment built-in features 30 with available services 350 that can be retrieved from external cloud server 210 in cloud 4 and installed and executed on private cloud server 360 or possibly installed on RAC 314, discussed in greater detail below. If needed by RAC 314, available services 350 may be delivered/deployed by leveraging and extending on top of existing firmware in RAC 314.

Advantageously, embodiments may provide vendor-agnostic, unified and seamless system management across generations of servers 312. Embodiments may further provide accelerated delivery of new available services 350 with subscription-based granular licensing.

Referring to FIG. 3, data centers 310 may each have multiple servers 312. Data center 310-1 may have a first plurality of servers 312 (e.g., 2 to M) divided into P groups 340, wherein group 340-1 may have a first set of servers 312 (e.g., 1 to A), group 340-2 may have a second set of servers 312 (e.g., 1 to B) and group 340-P may have a third set of servers 312 (e.g., 1 to C). Data center 310-1 may further comprise private cloud server 360-1 communicatively coupled to all servers 312-1 to 312-M in data center 310-1. Private cloud server 360-1 may be communicatively coupled to external cloud server 210 in cloud 4.

Data center 310-2 may have a second plurality of servers 312 (e.g., 2 to N) divided into Q groups 340, wherein group 340-4 may have a first set of servers 312 (e.g., 1 to D), group 340-2 may have a second set of servers 312 (e.g., 1 to E) and group 340-Q may have a third set of servers 312 (e.g., 1 to F). Data center 310-2 may further comprise private cloud server 360-2 communicatively coupled to all servers 312-1 to 312-N in data center 310-2. Private cloud server 360-2 may be communicatively coupled to external cloud servers 210 in cloud 4.

Figure 6:
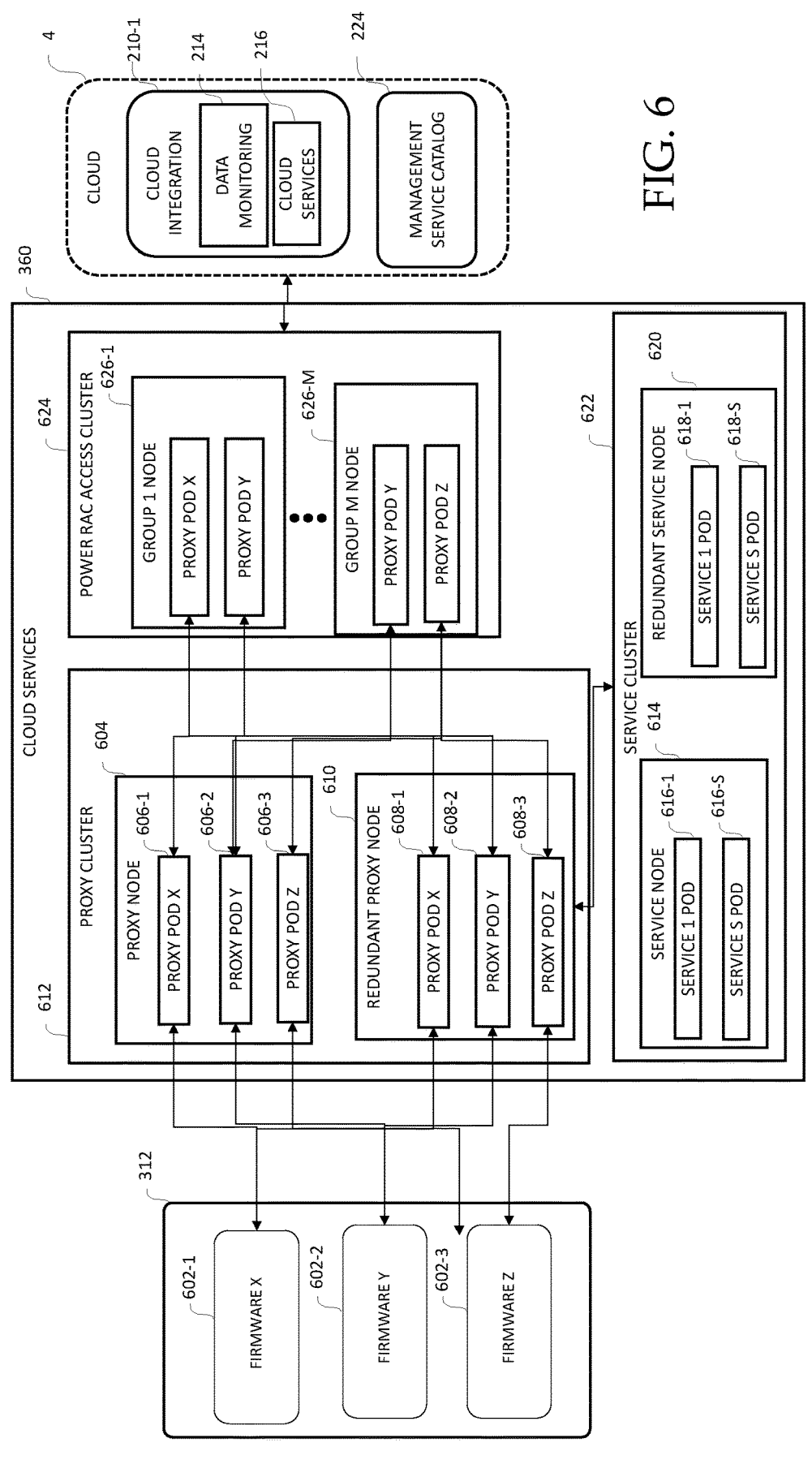
FIG. 6 depicts one embodiment of a deployment architecture for providing available services to a RAC.

Groups 340 may be logical groups, discussed in greater detail with respect to FIG. 6.

Referring to FIG. 4, external cloud server 210 may communicate with private cloud servers 360 over a network to provide available services 350.

Cloud integration service 210-1 may include data monitoring 214 and cloud services 216. Dell CloudIQ is an example of a data monitoring service 214 that may monitor operation of servers 312 in data centers 310 for data protection. Dell APEX is an example catalog of cloud services 216 that may integrate infrastructure and software for cloud operations.

Infrastructure Solutions Group (ISG) server 210-2 may provide storage and networking services, and may include third-party services 350-18. In some embodiments, ISG server 210-2 may provide RAC proxy on Data Processing Unit (DPU) service 220 to private cloud server 360 to offload processing.

Management Service Catalog (MSC) server 210-3 may store a database of available services 350 that can be provided to private cloud servers 360. In some embodiments, private cloud server 360 communicates with MSC server 210-3 to retrieve available services 350. In some embodiments, MSC server 210-3 communicates with private cloud server 360 to install available services 350.

IoT integration service 210-4 may enable devices to communicate with other devices and enable external cloud servers 210 to communicate with or monitor devices in servers 312.

Autonomous server manager 210-5 may provide server management without a user.

Turning to one or more of FIGS. 4 and 5, servers 312 may be similar to servers 12 depicted in FIG. 2 in that they comprise hardware such as a PSU for receiving power from a source and transforming the power into usable power by the server, a fan, network IC (NIC) for communications, other controllers such as RAID controllers, and Complex Logic Programmable Devices (CPLDs). Servers 312 also include BIOS 26-1, NIC 26-2, fan control 26-3, PSU service 26-4 for operating a PSU, remote controller service 26-5 for managing a RAID and CPLD service 26-6 for monitoring and managing CPLDs.

Firmware within RAC 314 on servers 312 may include a Representational State Transfer Application Programming Interface (REST API) 16 that allows servers 312 to communicate with each other. Remote monitoring may require communications with processes running in RAC 314. A D-Bus or other inter-process communications mechanism enables local communication between processes on RAC 314, wherein D-Bus interface 18 may allow RAC 314 to communicate over a D-Bus. RAC 314 may further comprise Remote Procedure Call (RPC) queue 302, D-Bus to RPC mapper 304 and D-Bus to REST mapper 306 for available services 350 on private cloud server 360 to communicate with HAL 22. In some embodiments, RPC mapper 304 may be a Google RPC (gRPC) mapper 304.

RAC 314 may also store hardware abstraction layer (HAL) 22 for communication and monitoring of peripheral devices. Within HAL 22, I2C 22-1, 13C 22-2, SPI 22-3, RMII 22-4, PCIe VDM 22-5 and MCTP 22-6 allow communications with chips, processors and microcontrollers in server 312.

Available Services May be Stored and Executed on a Private Cloud Server

Embodiments of private cloud server 360 may store a set of available services 350 retrieved from MSC server 210-3. In some embodiments, private cloud server 360 may determine, based on one or more of an application to be executed on a server 312 or a data set to be processed by a server 312, that a particular available service is needed and communicate with MSC server 210-3 to retrieve the available service 350. In some embodiments, private cloud server 360 may communicate with MSC server 210-3 to retrieve an available service 350 based on a subscription. Available services 350 may be executed by private cloud server 360 unless there is a need to have RAC 314 execute the available service 350.

Available Services May be Installed in a Rac if Needed

Embodiments may install available services 350 in RAC 314 from private cloud server 360, wherein the set of available services 350 stored in RAC 314 may be less than the total number of available services 350 stored in private cloud server 360 and less than the plurality of available services 350 stored in MSC server 210-3. Available services 350 may be installed in RAC 314 based on one or more of performance or capability. Once the process is complete or the available service 350 is no longer time-sensitive, embodiments may uninstall the available service 350 from RAC 314.

As a device-based example, referring to available service 350-13 (i.e., MCTP 350-13) and available service 350-10 (i.e., NC-SI 1.2 protocols 350-10), if a process sends a request to CPLD 26-6, a response may be expected in a minimum response time of about 50 milliseconds (ms) and a maximum response time of about 4 seconds. If the MCTP 350-13 and NC-SI 1.2 protocols 350-10 are stored in private cloud server 360, a response may take 5 seconds. Embodiments may install NC-SI 1.2 protocols 350-10 as a time sensitive plug-in 340 to ensure a response is received in less than 4 seconds. Once NC-SI 1.2 protocols 350-10 is not needed, NC-SI 1.2 protocols 350-10 may be uninstalled from RAC 314.

As another example, referring to available service 350-11 (i.e., PLDM 350-11) and available service 350-7 (i.e., Firmware update service 350-7), if there is a firmware update and PLDM 350-11 executing on private cloud server 360 cannot deliver the update payload within a maximum time (e.g., 4 seconds), the firmware update may time out. In this case, PLDM 350-11 and Firmware update service 350-7 may be installed as time sensitive plug-ins 340 to ensure the firmware update payload can be delivered in time. Once the firmware update payload is delivered, PLDM 350-11 and Firmware update service 350-7 may be uninstalled from RAC 314.

Existing Available Services Stored on Private Cloud Server

Box 352 contains a non-limiting list of available services 350 that may be installed on private cloud server 360 to communicate with RACs 314 on any servers 312 in data centers 310, wherein available services 350 in box 352 may function similar to features 30 described above with respect to FIG. 2 but execute on private cloud server 360. For example, RAC 314 may be configured with a minimum number of features 30 and private cloud server 360 may store and execute Web GUI service 350-1; Redfish® server management service 350-2; RACADM command-line service 250-3; SNMP service 350-4; Hardware (HW) inventory service 350-5 for tracking information and properties of hardware installed on servers 312; Firmware (FW) inventory service 350-6 for tracking information and versions of firmware installed on servers 312; FW update service 350-7 for installing Firmware updates in servers 312; Monitoring service 350-8 for coordinating monitoring of operation of servers 312; Unified database 350-9 for storing information for sharing among processes and applications executing on servers 312; NC-SI service 350-10; PLDM service 350-11; SPDM service 350-12 and MCTP service 350-13. In some embodiments, available services 350 may be retrieved from Management Service Catalog server 210-3 through subscriptions, wherein any available service 350 may be retrieved as needed.

New Services and Services with Increased Scope

Embodiments may allow private cloud server 360 to provide additional available services 350 and available services 350 with increased scope that increase the capabilities of RAC 314. Box 354 contains a non-limiting list of available services 350 that may be retrieved from MSC server 210-3 and installed on private cloud server 360. Some available services 350 in box 354 may be executed by private cloud server 360. Some available services 350 in box 354 may be installed on RAC 314 on any server 312 in data center 310.

Credentials Service

A user must have administrative credentials to run RACADM commands remotely. When a user wants to run RACADM commands, the user must first be validated by RAC 314. Traditionally, RAC 14 corresponding to server 12 in FIG. 2 may store credentials for one to about sixteen users. Embodiments described herein allow private cloud server 360 to download and execute credentials service 350-15, which may be configured to manage credentials for one user to more than sixteen users and map the credentials to RACs 314 as needed. In some embodiments, unified database 350-9 on private cloud server 360 may be configured to store credentials for a large number of users (e.g., over a thousand) to increase the scope of credentials service 350-9 over credentialing features 30 commonly found in RACs 14. In some embodiments, private cloud server 360 may be configured to install credential service 350-15 and store a database in unified database 350-9 with the credentials for any number of users between one to over a thousand. As the number of users changes, private cloud server 360 may update the database. In some embodiments, credentials service 350-15 may validate users. In some embodiments, credentials service 350-15 may register itself as a credentials manager, receive requests, and validate users such that RAC 314 does not validate but knows the user is validated.

Telemetry Service

Some Baseboard Management Controllers (BMCs) have no intelligence to adjust telemetry collection based on server events/errors or have different streaming rate for each metric. Traditionally, RAC 14 in server 12 may send the same information multiple times or at different rates, tying up networking resources and memory. Telemetry service 350-16 may be retrieved from MSC server 210-3 and installed on private cloud server 360. In some embodiments, an Open Telemetry (OTEL) service 350-16 may be stored in private cloud server 360 as an available service 350. When servers 312 communicate data for telemetry purposes, telemetry service 350-16 executing on private cloud server 360 may aggregate data, remove redundant data, or otherwise coordinate the communication of data, resulting in reduced network congestion. In some embodiments, telemetry service 350-16 may be installed in RAC 314 to meet telemetry requirements and then uninstalled after server 312 does not need to meet any telemetry requirements. In some embodiments, telemetry service 350-16 may be installed in RAC 314 as a time-sensitive plug-in 340 to provide quicker responses to telemetry requirements and then uninstalled after server 312 does not need quick responses to meet telemetry requirements.

AI/ML Service

Artificial Intelligence (AI)/Machine learning (ML) service 350-17 may include services necessary for AI/ML. If a server 312 (or a set of servers 312) is needed for AI/ML, AI/ML service 350-17 may be downloaded to private cloud server 360 for coordinating processing by servers 312 for AI/ML processing.

Third Party Services

Third party services 350-18 may include services needed for particular third-party applications. Advantageously, instead of all available services 350 being tied to particular hardware, embodiments may enable third-party services 350-18 to execute on private cloud server 360, wherein other available services 350, RPC queue 302, D-Bus to RPC mapper 304 and D-Bus to REST mapper 306 enable third-party services 350-18 on private cloud server 360 to communicate with HAL 22 in one or more RACs 314.

Advanced Power/Thermal Service

Advanced power/thermal service 350-19 may be stored on private cloud server 360 and may refer to an available service 350 that can be executed on private cloud server 360 to communicate with RACs 314 on multiple servers 312 to monitor or control power or thermal operations of one or more servers 312. For example, data center 310 may have multiple floors with hundreds of racks of servers 312. Each RAC 314 may communicate with sensors inside a server 312 for remotely and individually monitoring temperature of that server 312. Advanced power/thermal service 350-19 may allow a user to remotely and collectively monitor and manage temperatures for multiple servers 312, such as all servers 312 processing a set of information, all servers 312 in a rack or all servers 312 on a floor. In some embodiments, advanced power/thermal service 350-19 may be installed in RAC 314 (e.g., as a time-sensitive plug-in 340) for quicker response to power/thermal requirements and then uninstalled after server 312 does not need to operate under advanced power/thermal requirements.

Secure Zero Touch Provisioning (Sztp) Service

Secure Zero-Touch Provisioning (sZTP) service 350-20 enables a server 312 to securely provision a network device when booting in a default state. If server 312 is expected to require communication over a network, sZTP service 350-20 executing on private cloud server 360 may ensure the network device is securely provisioned. In some embodiments, sZTP service 350-20 may be installed in RAC 314 for booting and uninstalled once server 312 has successfully booted. In some embodiments, sZTP service 350-20 may be installed on private cloud server 360 and installed on servers 312 (e.g., as a time-sensitive plug-in 340) as needed to ensure network devices are securely provisioned.

Ism Services

Integrated Dell Remote Access Controller (iDRAC) Service Manager service 350-21 may refer to available services 350-21 that may be executed to monitor and manage operation of RAC 314.

Fido Device Onboard (Fdo) Service

Fast IDentity Online (FIDO) Device Onboard (FDO) service 350-22 allows onboarding and trusting of new devices (e.g., RAC 314) within an environment. For example, RAC 314 may be Linux-based and one or more available services 350 may be Windows-based. FDO service 350-22 may enable servers 312 to execute Linux-based services 350 and Windows-based services 350. Data centers 310 may have hundreds or thousands of servers 312. Devices in servers 312 may be removed and exchanged for newer devices. Instead of a remote user configuring each device and deploying required applications, FDO service 350-22 allows multiple devices in various servers 312 to be configured correctly. In some embodiments, FDO service 350-22 may be installed in RAC 314 for quicker configuring and deployment and uninstalled once server 312 has successfully configured and deployed new devices. In some embodiments, FDO service 350-22 may be installed on private cloud server 360 and installed on servers 312 (e.g., as a time-sensitive plug-in 340) as needed to ensure new devices are quickly configured and deployed.

Internet of Things (IoT) Integration Service

IoT Integration service 350-23 may be installed on private cloud server 360 to facilitate integration between devices on servers 312. Advantageously, instead of each server 312 in multiple data centers 310 communicating with IoT integration server 210-4, private cloud server 360 may perform some of the integration, wherein other available services 350, RPC queue 302, D-Bus to RPC mapper 304 and D-Bus to REST mapper 306 enable private cloud server 360 to communicate with HAL 22 in one or more RACs 314 in servers 312 that may have different devices.

Feature Tour

Feature Tour service 350-24 may be installed to guide users through features 30 available to server 312. Advantageously, instead of each RAC 314 in each server 312 in multiple data centers 310 storing all the information necessary to guide users through only features 30 installed on that server, private cloud server 360 may store all the information and provide information including features 30 and available services 350 available to a particular server 312. An end user may not know whether a feature is installed on server 312 or is instead an available service 350 accessible by server 312. In some embodiments, private cloud server 360 may install feature tour service 350-24 with information relevant to a particular server 312 on RAC 314 associated with the particular server 312.

Infrastructure Programmer Developer Kit (Ipdk) Service

IPDK service 350-25 is an open-source, vendor-agnostic framework of drivers and APIs. IPDK service 350-25 may be too large to install on each RAC 314 in each server 312. IPDK service 350-25 may be installed on private cloud server 360 for infrastructure offload and management.

For each available service 350, if the available service 350 is needed for a particular server 312, a version of the available service 350 may be retrieved from external cloud server 210 and executed on private cloud server 360, wherein RAC 314 contains a minimum number of built-in controls 20 and features 30 to communicate with private cloud server 360, wherein private cloud server 360 comprises memory and processors for executing the available service 350. If, at some later time, the available service 350 is not needed on a particular server 312, the available service 350 may be uninstalled from RAC 314 but a version may still be stored in private cloud server 360 or the available service 350 may be uninstalled from private cloud server 360.

Mso-Management Service Orchestrator

MSO 356 may coordinate between features and ensure any service 350 is compatible with other available services 350 and hardware in server 312 and that no conflicts exist. For example, regarding telemetry, a manufacturer may have a default telemetry service 20 installed in firmware, but a customer may want to use Open Telemetry (OTel) service 350-16 or a third-party telemetry service 350-18. If the customer requests another telemetry service. MSO 356 may determine whether the requested telemetry application will work, if an existing telemetry feature needs to be disabled or an existing telemetry service 350-16 or 350-18 needs to be uninstalled.

Large Send Offload (Lso)

Large Send Offload (LSO) service 358 may increase the egress throughput of high-bandwidth network connections. LSO service 358 may be installed on PCS 312, reducing workload performed by RAC 314. In some embodiments, LSO 358 enables communication with RAC Proxy on DPU service 220 to offload large workloads.

Provisioning Available Services with Redundancy

Referring to FIG. 6, embodiments may provide available services 350 to multiple RACs 314. Each server 312 may have multiple firmware 602 associated with a Baseboard Management Controller (BMC) or a Remote Access Controller (RAC) 314. For example, firmware 602-1 and 602-2 may correspond to firmware X and firmware Y and may be associated with hardware such as a GPU installed in one or more servers 312, whereas firmware 602-3 may correspond to firmware Z and may be associated with High Density memory (HDM) installed in one or more servers 312. Each firmware 602 may be mapped one-to-one with a proxy pod 606 in a proxy node 604 and a redundant proxy pod 608 in a redundant proxy node 610 (e.g., firmware 602-1 may be mapped to proxy pod 606-1 in proxy node 604 and redundant proxy pod 608-1 in redundant proxy node 610).

Redundant proxy node 610 may make sure connectivity is maintained with server 312. For example, proxy node 604 may be on a first server 312 and redundant proxy node 610 may be on a second server 312. Thus, if firmware 602 needs to be updated or a server 312 needs to be powered on and proxy node 604 is down, firmware 602 may be updated using redundant proxy node 610.

Proxy node 604 and redundant proxy node 610 may form part of proxy cluster 612. Proxy clusters 612 may be configured to manage servers 312 hosting proxy nodes 604 and redundant proxy nodes 610. For example, a proxy cluster 612 may be configured such that a server 312 hosting proxy node 604 and a server 312 hosting redundant proxy node 610 are always powered on, a server 312 hosting proxy node 604 is powered on when a server 312 hosting redundant proxy node 610 is powered down, idle or not responding, or a server 312 hosting redundant proxy node 610 is powered on when a server 312 hosting proxy node 604 is powered down, idle or not responding.

Embodiments may also provide redundancy in available services 350. Cloud services server 216 may contain service cluster 622 with service pods 616-1 to 616-S in service node 614 and service pods 618-1 to 618-S in redundant service node 620. Presently, there are approximately 200 available services 350 that may be provisioned using embodiments disclosed herein. Thus, if an available service 350 cannot be provisioned using a service pod 616 (e.g., a server 312 hosting service node 614 is powered down or idle), the available service 350 may still be provisioned using redundant service pod 618. For example, service pod 616-1 may correspond with credentials service 350-15 (depicted in FIG. 5). If a firmware update is needed to provision credentials service 350-15 to one or more servers 312, embodiments may try to provision credentials service 350-15 using a first firmware update service (e.g., service 1 pod 616-1). If service pod 616-1 is unavailable, embodiments may provision credentials service 350-15 using redundant service 1 pod 618-1.

Referring back to FIG. 3, access cluster 624 may contain group nodes 626-1 to 626-M, wherein all servers 312 in a group 320 are associated with a group node 626. For example, servers 312 in group 320-1 depicted in FIG. 3 are associated with group 1 node 626-1 in FIG. 6. If an available service 350 is to be provisioned to servers 312 in group

320-1, embodiments may provision the available service 350 using group 1 node 626-1. A group node 626 may be associated with one or more servers 312 based on hardware or node access. Servers 312 can be added to or removed from group nodes 626 as needed.

System management solutions like iDRAC Service Module (iSM) plugin, iSM-Lifecycle Management Extensions (iSM-LME), and iDRAC Software Developer Kits (SDK) may extend or leverage built-in features 30 in RAC 14, but they may work in silos. For example, an iSM plug-in feature cannot be deployed in some RAC SDKs such that there is no interoperability. Furthermore, server vendors may have different System Management portfolios, which do not typically have capabilities to manage other vendor servers efficiently.

Figure 7:
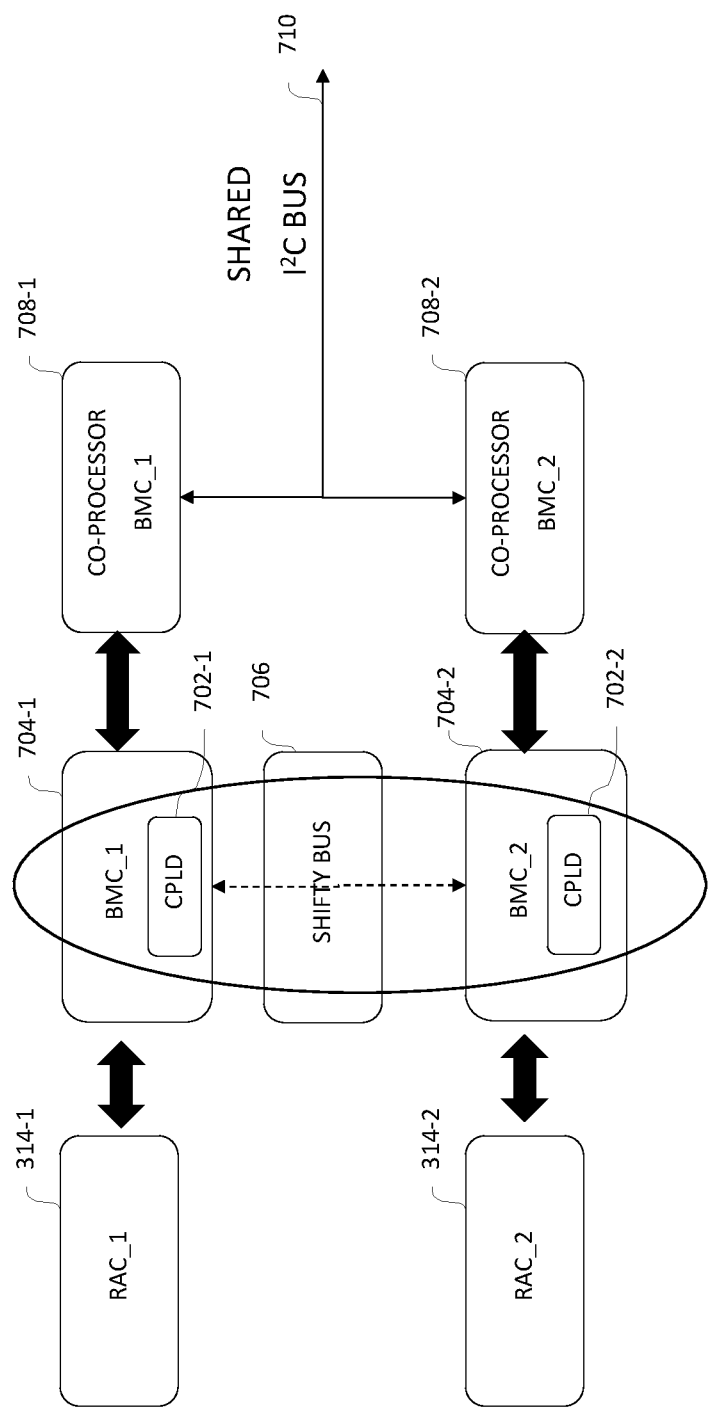
FIG. 7 depicts one embodiment of a portion of an information handling system having two baseboard management controllers (BMCs) communicating with each other through a Complex Programmable Logic Devices (CPLDs) and over a bus.

Referring to FIG. 7, in some embodiments, there may be two RAC SOCs (Systems on a Chip) working in active-active hardware redundancy configuration. Using this configuration, the two RAC SOCs need hardware synchronization between them, which is complex. RAC 314-1 may communicate with CPLD 702-1 in BMC 704-1 and RAC 314-2 may communicate with CPLD 702-2 in BMC 704-2, wherein BMC 704-1 and BMC 704-2 may communicate with each other over Shifty bus 706.

BMC 704-1 can be in communication with BMC 704-2 over an arbitration bus 708. The arbitration bus 708 can be a shared bus between BMC 704-1 and BMC 704-2. For example, BMC 704-1 may arbitrate with co-processor 708-1 and BMC 704-2 may arbitrate with co-processor 708-2 for communication with bus 710, which may be, for example, an I2C bus.

Intent-Driven Location of Services

Services 350 may be deployed in one of five locations. The location of a particular service 350 may be based on how available the service 350 needs to be (e.g., time critical services 350 need high availability) or may be based on user intent (e.g., redundancy or high reliability for performance).

Chart 1 depicts location options for Proxy Pods 606, Proxy Clusters 604, Service Pods 616, Service Clusters 622 and Power RAC Access Clusters 624, wherein "N" may indicate the option is not recommended at that location; "P" may indicate the option is possible or feasible at that location; "R" may indicate the option is recommended at that location; and "R**" may indicate the option is recommended at that location for BMC-less deployment.

CHART 1

| | Server 312 | | | Private | Public |
|---|---|---|---|---|---|
| | RAC 314 | Server OS/UEFI | DPU OS | Cloud Server 360 | Cloud Server 210 |
| RAC Proxy Pod | N | P/R | R | R | N |
| RAC Proxy Cluster | N | N | N | R | N |
| Service Pod | N | N | P | R | R |
| Service Cluster | N | N | P | R | R |
| Power RAC Access Cluster | N | N | P | R | R |

As illustrated in Chart 1, server 312 may comprise memory accessible by RAC 314, Server OS/UEFI and/or DPU OS for fastest processing of information. To minimize the amount of firmware stored in RAC 314, memory in RAC 314 is not preferred for deployment of any of Proxy Pods 606, Proxy Clusters 604, Service Pods 616, Service Clusters 622 and Power RAC Access Clusters 624, although Service Pod 616 may possibly be stored in RAC 314 (e.g., for time critical services). A memory accessible by a server OS/UEFI may be possible and even recommended for BMC-less deployments and Service Pod 616 may possibly be stored in memory accessible by Server OS/UEFI. However, a memory accessible by Server OS/UEFI is not preferred for deployment of Proxy Clusters 604, Service Clusters 622 and Power RAC Access Clusters 624. A memory accessible by DPU OS may be recommended for Proxy Pods 606 but not for Proxy Clusters 604. A memory accessible by DPU OS may be possible for Service Pods 616, Service Clusters 622 and Power RAC Access Clusters 624

Public cloud server 210 may be recommended for Service Pods 616, Service Clusters 622 and Power RAC Access Clusters 624. For example, communication with public cloud server 210 may be slow, so using public cloud server 210 to provide RAC Proxy Pods 606 may be too slow but public cloud server 210 may perform some services 350 such that the slow speed does not significantly impair deployment or operation. Memory accessible by DPU OS may be recommended for RAC Proxy Pods 606.

A deployment priority may be: memory accessible by a DPU OS; memory accessible by Private Cloud Server 360; memory accessible by RAC SDK; memory accessible by a Server OS and Public Cloud Server 210.

A consolidated management service catalog may comprise a system management and orchestration cloud service repository. The available services 350 may be capable of vendor-agnostic unified seamless system management across generations since Hardware Abstraction Layer and Time critical services alone will remain as RAC firmware (e.g I2C, MCTP, Thermal & Power control and all the other value-added features 30 in servers 12 may be deployed in servers 312 as available services 350) from either a private cloud server 360 r public cloud server 210.

In some embodiments, services 350 may communicate with firmware in RAC 314 via Redfish® 350-2, REST API 16 or gRPC 302.

In some embodiments, private cloud server 360 may be capable of injecting proxy app services 350 to memory accessible by RAC SDK/Server OS/DPU to handle any time sensitive operations for better performance.

In some embodiments, management services 350 running in public cloud servers 210 may collaborate among themselves without RAC Firmware involvement.

Common framework like Lifecycle Service Orchestration Service (LSO) 358 may be leveraged for integration with third party services 350-18, common licensing as well as interoperability among services 350 like iDRAC SDK, ISG One (DPU OS Plugins) from server 210-2, iSM (iDRAC Service Module) plugins 350-21, Management OS application, DCM (Dell Connectivity Module).

Software that are defined as high availability and based on Redundant proxy services 610 may be synchronized between them to improve the performance.

In some embodiments, based on the customer intention, some services 350 are deployed on memory accessible by private cloud server 360, or on memory accessible by the DPU OS, or on memory accessible by the Server OS for better performance.

When System management & Orchestration detects that a server 312 does not have a BMC, it may deploy a Management OS and deploy a RAC proxy pod 608 to manage the BMC-less Server 312.

When System management & Orchestration detects that the server has a Data Processing Unit (DPU) then it may deploy a RAC proxy pod 608 on the DPU to optimize the performance and load balancing.

In the absence of private cloud server 360, services 350 may run directly from one or more public cloud servers 210.

Figure 8:
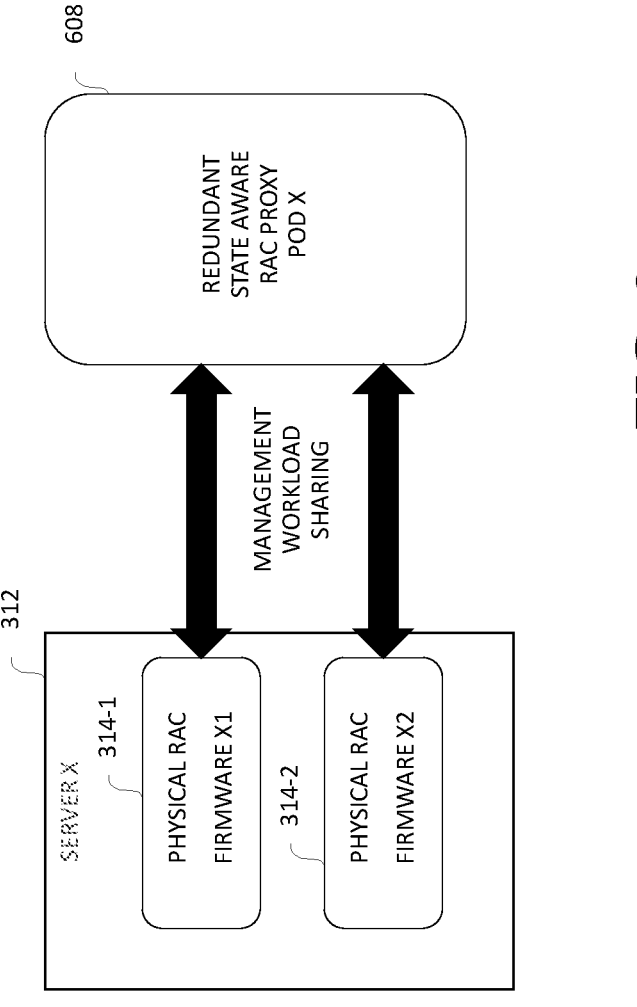
FIG. 8 depicts a partial system diagram, illustrating management workload sharing possible using embodiments disclosed herein.

Referring to FIG. 8, embodiments may provide software-defined redundancy services. As depicted in FIG. 7, some servers 312 may contain two RACs 314 with firmware in each RAC 314. A secure one-to-many (e.g., 1x many) binding of the RAC firmwares to a single Proxy Pod 606 may be performed and the Proxy Pod 606 may be marked with being in a redundancy state. In the redundancy state, Proxy Pod 606 may perform load balancing activities of services 350 in RAC 314. For example, if there is a firmware update, Proxy Pod 606 may divide the firmware update and send one set of firmware updates to one BMC and another set of firmware updates to the other BMC. Embodiments may maintain the consistency of a physical topology configuration among RAC firmwares.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A system in a server comprising a plurality of devices, a data processing unit (DPU) executing a DPU operating system (OS) and a memory storing one or more of a server OS and a unified extensible firmware interface (UEFI), the system comprising:

a remote access controller (RAC) comprising:

a RAC processor; and a memory storing:

a set of controls, the set of controls comprising a power control for monitoring power supplied to the server and a thermal control for monitoring a temperature of the server;

a hardware abstraction layer (HAL) for communicating with the plurality of devices;

a Desktop Bus (D-Bus) communications bus interface for communicating with the HAL and facilitate communications between a set of applications executing on the server;

a D-Bus to Remote Procedure Call (RPC) mapper for translating communications from one or more devices of the plurality of devices into an RPC format;

a D-Bus to Representational State Transfer (REST) mapper for translating communications from the one or more devices of the plurality of devices into a REST Application Programming Interface (API) format;

a Remote Procedure Call (RPC) queue to facilitate communication between two or more applications of the set of applications executing on the server; and a set of instructions executable by the RAC processor to execute the set of controls stored in the memory in the RAC;

a private cloud server (PCS) communicatively coupled to the server and an external cloud server, the private cloud server comprising:

a PCS processor; and a memory storing a set of instructions executable by the PCS processor for:

communicating with the external cloud server to identify a set of available services from a plurality of available services;

determining a location for executing one or more available services of the set of available services for processing information on the server; and installing the one or more available services of the set of available services at the location.

2. The system of claim 1, wherein:

the set of PCS instructions are executable by the PCS processor for:

determining an available service of the set of available services is needed by the server to process a set of information;

installing the available service in a set of services in the server;

determining when the available service has processed the information; and uninstalling the available service from the set of services in the memory in the server.

3. The system of claim 2, wherein the set of PCS instructions are executable by the PCS processor for:

determining the available service of the set of available services is needed by the RAC to process a set of information;

installing the available service in a set of services in the memory in the RAC;

determining when the available service has processed the information; and uninstalling the available service from the set of services in the memory in the RAC.

4. The system of claim 2, wherein the set of PCS instructions are executable by the PCS processor for:

determining the available service of the set of available services is needed by a server operating system (OS) or Unified Extensible Framework Interface (UEFI) to process a set of information;

installing the available service in a set of services accessible by the server OS or the UEFI;

determining when the available service has processed the information; and uninstalling the available service from the set of services accessible by the server OS or the UEFI.

5. The system of claim 2, wherein the set of PCS instructions are executable by the PCS processor for:

determining an available service of the set of available services is needed by a data processing unit (DPU) operating system (OS) to process a set of information;

installing the available service in a set of services in a memory accessible by the DPU OS;

determining when the available service has processed the information; and uninstalling the available service from the set of services in the memory accessible by the DPU OS.

6. The system of claim 1, wherein the set of PCS instructions are executable by the PCS processor for:

determining the PCS as a location for executing one or more available services of the set of available services for processing information; and installing the one or more available services of the set of available services in the PCS.

7. The system of claim 1, wherein the set of PCS instructions are executable by the PCS processor for:

determining a public cloud server as a location for executing one or more available services of the set of available services for processing information; and communicating with the public cloud server executing the one or more available services.

8. A data center comprising:

a plurality of servers, wherein each server comprises:

a remote access controller (RAC) comprising a RAC processor; and a memory storing:

a set of controls, the set of controls comprising a power control for monitoring power supplied to the server and a thermal control for monitoring a temperature of the server;

a hardware abstraction layer (HAL) for communicating with the plurality of servers; a Desktop Bus (D-Bus) communications bus interface for communicating with the HAL and facilitate communications between a set of applications executing on the server;

a D-Bus to Remote Procedure Call (RPC) mapper for translating communications from one or more devices of the plurality of servers into an RPC format;

a D-Bus to Representational State Transfer (REST) mapper for translating communications from one or more devices of the plurality of servers into a REST Application Programming Interface (API) format;

a Remote Procedure Call (RPC) queue to facilitate communication between two or more applications of the set of applications executing on the server; and a set of instructions executable by the RAC processor to execute the set of controls stored in the memory in the RAC;

wherein at least one server of the plurality of servers comprises a private cloud server (PCS) communicatively coupled to the plurality of servers and an external cloud server, the private cloud server comprising:

a PCS processor; and a memory storing a set of instructions executable by the PCS processor for: communicating with the external cloud server to identify a set of available services from a plurality of available services;

determining a location for executing one or more available services of the set of available services for processing information on the server; and installing the one or more available services of the set of available services at the location.

9. The data center of claim 8, wherein the set of PCS instructions are executable by the PCS processor for:

determining an available service of the set of available services is needed by a server of the plurality of servers to process a set of information;

installing the available service in a set of services in the server;

determining when the available service has processed the information; and uninstalling the available service from the set of services in the memory in the server.

10. The data center of claim 9, wherein the set of PCS instructions are executable by the PCS processor for:

determining the available service of the set of available services is needed by a RAC in the server to process a set of information;

installing the available service in a set of services in the memory in the RAC;

determining when the available service has processed the information; and uninstalling the available service from the set of services in the memory in the RAC.

11. The data center of claim 9 wherein the set of PCS instructions are executable by the PCS processor for:

determining the available service of the set of available services is needed by a server operating system (OS) or a Unified Extensible Framework Interface (UEFI) to process a set of information on the server;

installing the available service in a set of services in a memory accessible by the server OS or the UEFI;

determining when the available service has processed the information; and uninstalling the available service from the set of services in the memory accessible by the server OS or the UEFI.

12. The data center of claim 9, wherein the set of PCS instructions are executable by the PCS processor for:

determining an available service of the set of available services is needed by a data processing unit (DPU) operating system (OS) to process a set of information in the server;

installing the available service in a set of services in a memory accessible by the DPU OS;

determining when the available service has processed the information; and uninstalling the available service from the set of services in the memory accessible by the DPU OS.

13. The data center of claim 8, wherein the set of PCS instructions are executable by the PCS processor for:

determining the PCS as a location for executing one or more available services of the set of available services for processing information; and installing the one or more available services of the set of available services in the PCS.

14. The data center of claim 8, wherein the set of PCS instructions are executable by the PCS processor for:

determining a public cloud server as a location for executing one or more available services of the set of available services for processing information; and communicating with the public cloud server executing the one or more available services.

15. A method of operating a data center comprising a plurality of servers, the method comprising:

storing, on each server of the plurality of servers:

a set of controls, the set of controls comprising a power control for monitoring power supplied to a server and a thermal control for monitoring a temperature of the server;

a hardware abstraction layer (HAL) for communicating with a plurality of devices;

a Desktop Bus (D-Bus) communications bus interface for communicating with the HAL and facilitate communications between a set of applications executing on the server;

a D-Bus to Remote Procedure Call (RPC) mapper for translating communications from one or more devices of the plurality of devices into an RPC format;

a D-Bus to Representational State Transfer (REST) mapper for translating communications from one or more devices of the plurality of devices into a REST Application Programming Interface (API) format;

a Remote Procedure Call (RPC) queue to facilitate communication between two or more applications of the set of applications executing on the server; and a set of instructions executable by the RAC processor to execute the set of controls stored in the memory in the RAC;

identifying, by a private cloud server, a set of available services from a plurality of available services;

determining a location for executing one or more available services of the set of available services, the location comprising one of a memory in the server, a memory in the RAC or a memory in the private cloud server; and retrieving the one or more available services of the set of available services from an external cloud server over a network;

installing the one or more available services at the location; and executing the set of available services for processing information on a set of servers of the plurality of servers.

16. The method of claim 15, wherein the set of PCS instructions are executable by the PCS processor for:

determining an available service of the set of available services is needed by a server of the plurality of servers to process a set of information;

installing the available service in a set of services in the server;

determining when the available service has processed the information; and uninstalling the available service from the set of services in the memory in the server.

17. The method of claim 16, wherein the set of PCS instructions are executable by the PCS processor for:

determining the available service of the set of available services is needed by a RAC in the server to process a set of information;

installing the available service in a set of services in the memory in the RAC;

determining when the available service has processed the information; and uninstalling the available service from the set of services in the memory in the RAC.

18. The method of claim 16, wherein the set of PCS instructions are executable by the PCS processor for:

determining the available service of the set of available services is needed by a server operating system (OS) or a Unified Extensible Framework Interface (UEFI) to process a set of information on the server;

installing the available service in a set of services in a memory accessible by the server OS or the UEFI;

determining when the available service has processed the information; and uninstalling the available service from the set of services in the memory accessible by the server OS or the UEFI.

19. The method of claim 16, wherein the set of PCS instructions are executable by the PCS processor for:

determining an available service of the set of available services is needed by a data processing unit (DPU) operating system (OS) to process a set of information in the server;

installing the available service in a set of services in a memory accessible by the DPU OS;

determining when the available service has processed the information; and uninstalling the available service from the set of services in the memory accessible by the DPU OS.

20. The method of claim 15, wherein the set of PCS instructions are executable by the PCS processor for:

determining the PCS as a location for executing one or more available services of the set of available services for processing information; and installing the one or more available services of the set of available services in the PCS.

* * * * *